United States Patent [19]
Eckert

[11] Patent Number: 6,006,648
[45] Date of Patent: Dec. 28, 1999

[54] METHOD OF OPERATING A PNEUMATIC BRAKE SERVO-UNIT

[75] Inventor: Alfred Eckert, Bodenheim, Germany

[73] Assignee: ITT Manufacturing Enterprises Inc., Wilmington, Del.

[21] Appl. No.: 08/945,867

[22] PCT Filed: Feb. 28, 1997

[86] PCT No.: PCT/EP97/00988

§ 371 Date: Jan. 27, 1998

§ 102(e) Date: Jan. 26, 1998

[87] PCT Pub. No.: WO97/32768

PCT Pub. Date: Sep. 12, 1997

[30] Foreign Application Priority Data

Mar. 9, 1996 [DE] Germany ............................ 196 09 192

[51] Int. Cl.⁶ ..................................................... F15B 13/16
[52] U.S. Cl. ............................. 91/361; 91/367; 91/367 R
[58] Field of Search ........................... 91/361, 367, 369.1, 91/376 R

[56] References Cited

U.S. PATENT DOCUMENTS 4,953,444  9/1990  Cunningham et al. ....................... 91/1
5,704,694  1/1998  Kozakai ............................. 91/376 R X

FOREIGN PATENT DOCUMENTS 43 24 688   1/1995   Germany .
195 20 609 12/1995   Germany .

OTHER PUBLICATIONS

Article published in "ATZ Automobiltechnische Zeitschrift 97", No. 1, Jan. 1995, Germany, pp. 36, 37.

Primary Examiner—Hoang Nguyen
Attorney, Agent, or Firm—Rader, Fishman & Grauer PLLC

[57] ABSTRACT

To extend the control range of the pressure control in a brake system which is equipped with a brake power booster that is operable irrespective of the driver's wish, preferably electromagnetically, according to the present invention, the hydraulic pressure introduced into a master brake cylinder connected downstream of the brake power booster is determined and, following a comparison with a preset pressure value signal, is sent to a pressure controller having an output quantity which corresponds to a control current for the solenoid and is supplied to a limiter that determines the limit values of the desired control range, and the output quantity of the limiter is compared with the value of the current supplied to the solenoid. Subsequently, the comparison result is sent to a current controller which generates the voltage to be applied to the solenoid.

7 Claims, 5 Drawing Sheets

METHOD OF OPERATING A PNEUMATIC BRAKE SERVO-UNIT

BACKGROUND OF THE INVENTION

The present invention relates to a method of operating a pneumatic brake power booster including a movable wall and a control valve controlling a pneumatic pressure differential which acts upon the movable wall, the control valve having at least two sealing seats and an elastic valve member which interacts with the sealing seats, and, on the one hand, being operable by the driver by way of an actuating rod and, on the other hand, by a solenoid which is in a force-transmitting connection with one of the sealing seats.

German patent application No. 43 24 688 discloses a brake power booster for implementing a method of this type. The brake power booster is operable electromechanically irrespective of the driver's wish, i.e. of a brake pedal actuation. The special characteristics of the prior art brake power booster include sensor elements which permit identification of the valve member of the control valve in order to achieve a controlled proportioning of the independent actuating force to be generated by the solenoid. Further, an information about the travel covered during the control process by the electromechanically operable sealing seat is required for the control. This necessitates further sensor elements including the associated electronics.

However, the use of the mentioned sensor means involves a considerable amount of costs.

The article "Electronically Controlled Brake Power Booster" published in the Automobile Technology Journal ATZ 97 (1995) January, No.1, pages 36–37, describes an electrically operable booster with a proportional control. The control valve of the booster is drivable by a proportional electromagnet. A disadvantage in the mentioned booster is the comparatively high weight of the proportional magnet and the related increased overall dimensions of the booster. Another disadvantage is the relatively exact control which is assessed as costly.

Therefore, an object of the present invention is to disclose a method of the previously mentioned type which, when implemented, obviates the need for any additional sensor means and can be achieved at low cost with already provided parts. Another objective is to extend the control range predetermined due to tolerances.

SUMMARY OF THE INVENTION

According to the present invention, this object is achieved because the hydraulic pressure introduced into the master brake cylinder is determined and, along with a preset pressure value signal, is sent to a pressure controller, the output quantity of which corresponds to a control current for the solenoid and is supplied to a limiter. The limiter defines the limits of the desired control range, and its output quantity is compared with the value of the current supplied to the solenoid. The comparison result is sent to a current controller which generates the voltage to be applied to the solenoid.

A second solution of the object to be achieved involves that the hydraulic pressure introduced into the master brake cylinder is determined and, after a comparison with a preset pressure value signal, is sent to a non-linear transmission member with an upward and downward limitation. Connected downstream of the transmission member is a booster having an output quantity which is compared with the value of the current supplied to the solenoid. The comparison result is sent to a current controller which generates the voltage that is to be applied to the solenoid. It is favorable that a pre-control value is added to the output quantity of the non-linear transmission member.

Further details, features and advantages of the present invention can be taken from the following description of four embodiments, making reference to the accompanying drawings wherein corresponding individual parts have been assigned like reference numerals.

DETAILED DESCRIPTION OF THE DRAWINGS

Figure 1:
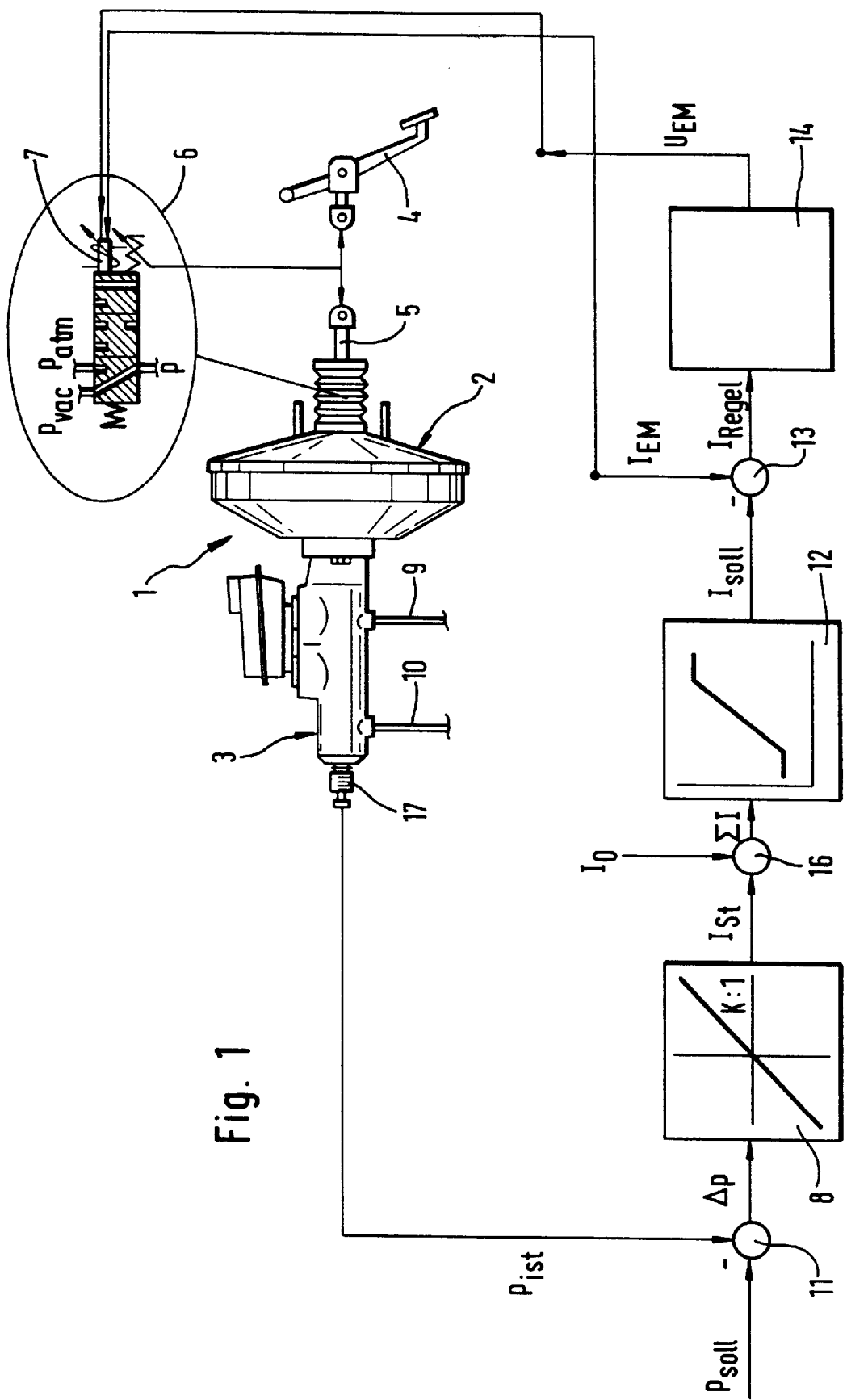
FIG. 1 is a greatly simplified view of a first design of a brake system for implementing the method of the present invention.

The brake system for automotive vehicles shown in the drawing, which is appropriate especially for pressure control operations, generally includes an actuating unit 1, an electronic controller, more particularly a pressure controller 8, and wheel brakes (not shown). The actuating unit 1, in turn, has a pneumatic brake power booster, preferably a vacuum brake power booster 2, operable by an actuating pedal 4. Connected downstream of booster 2 is a master brake cylinder 3, preferably a tandem master cylinder, having pressure chambers (not shown) which are connected to the wheel brakes by way of hydraulic lines 9, 10. Coupled to the actuating pedal 4 is an actuating rod 5 which is used to mechanically actuate a control valve 6 (illustrated only schematically). Control valve 6 controls the increase and decrease of a pneumatic differential pressure in the housing of the vacuum brake power booster 2. A solenoid 7 permits an (independent) actuation of the control valve 6 independently of the actuating rod 5. The independent actuation is preferably done by way of a sleeve (not shown) which interacts with the armature of the solenoid 7 and carries one of the sealing seats of the control valve 6.

Figure 5A:
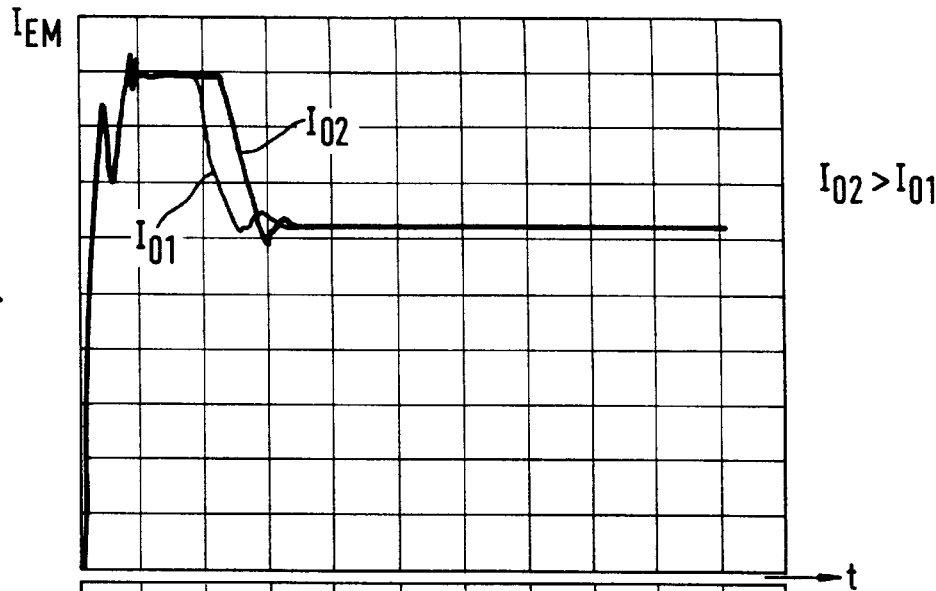
FIGS. 5a, b, c show time variations of the current (FIG. 5a) supplied to the solenoid, of the actuating travel of the sleeve actuating the control valve, or the armature of the solenoid (FIG. 5b), and the hydraulic pressure introduced into the master brake cylinder upon independent actuation (FIG. 5c), in the presence of two different values of a current correction value influencing the limits of the control range.
Figure 5B:
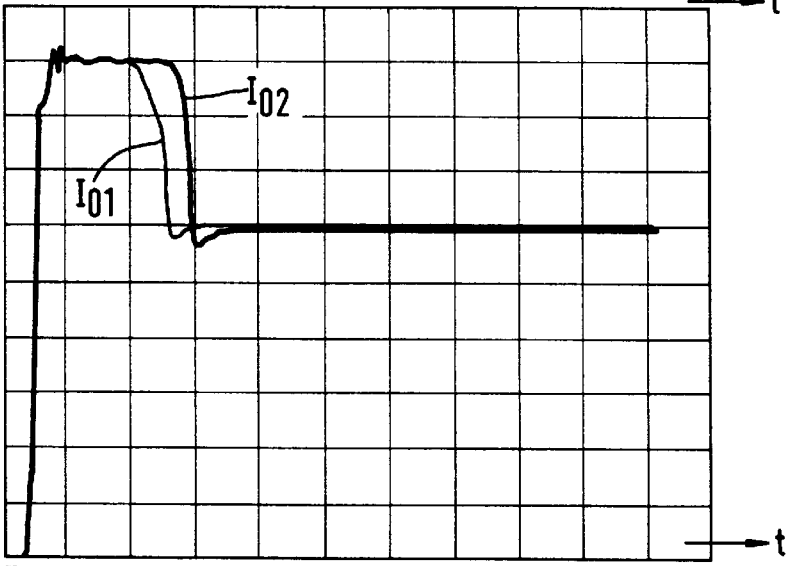
Figure 5C:
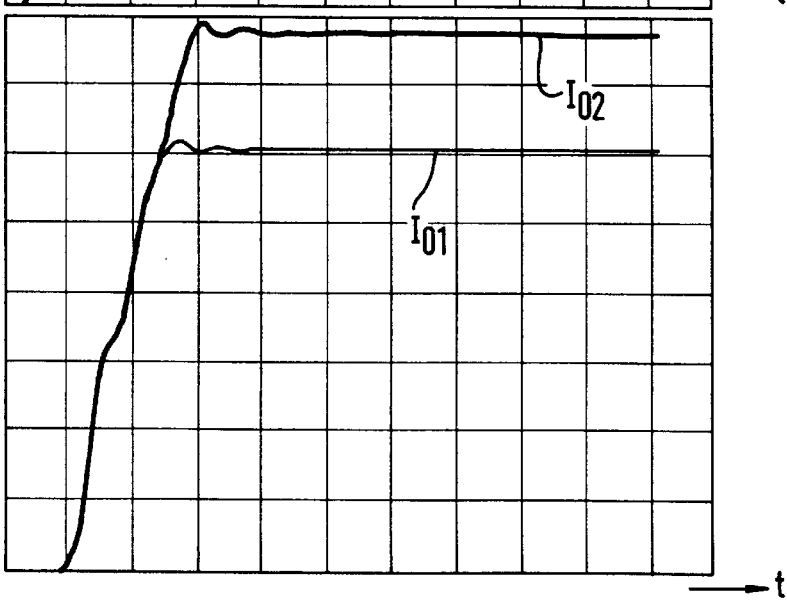

An actual pressure signal $P_{ist}$, which is generated by a pressure sensor 17 connected to the master brake cylinder 2, is compared in a comparator circuit 11 (connected upstream of the pressure controller 8) with a preset pressure value signal $P_{soll}$ so that a control difference βp is produced. The preset pressure value signal is furnished by a primary vehicle controller (not shown). The pressure controller 8 in the embodiment shown in FIG. 1 is a proportionally acting transmission member with a constant boosting factor K having an output signal $I_{St}$. Output signal $I_{St}$ is added to an invariably adjusted pre-control signal $I_0$ in an adder 16. The value of the signal $I_0$ determines the limits of the desired control range. This arrangement permits reducing the boosting factor K of the proportionally acting pressure controller 8, or converting the pressure controller 8 into a non-linear transmission member. Further, the ratio between signal and noise is thereby increased so that controllability is improved. The addition result ΣI is sent to a limiter 12 having an output signal which represents a nominal current value $I_{soll}$. The nominal current value $I_{soll}$ is compared with the measured current value $I_{EM}$ sent to the solenoid 6 in a second comparator circuit 13. The comparison result $I_{Regel}$ is processed in a current controller 14 connected downstream of the comparator circuit 13 to a signal value representative of the voltage $U_{EM}$ applied to the solenoid 6. FIGS. 5a, b and c show the influence of the above-mentioned pre-control signal $I_0$ on the variation of the current $I_{EM}$ supplied to the solenoid 7, of the actuating travel $S_{Anker}$ of the armature of the solenoid 7, and of the hydraulic pressure $P_{ist}$ introduced into the master brake cylinder 3 in the event of independent actuation with different values $I_{01}$ and $I_{02}$. $I_{02}$ was chosen to be greater than $I_{01}$.

Figure 2:
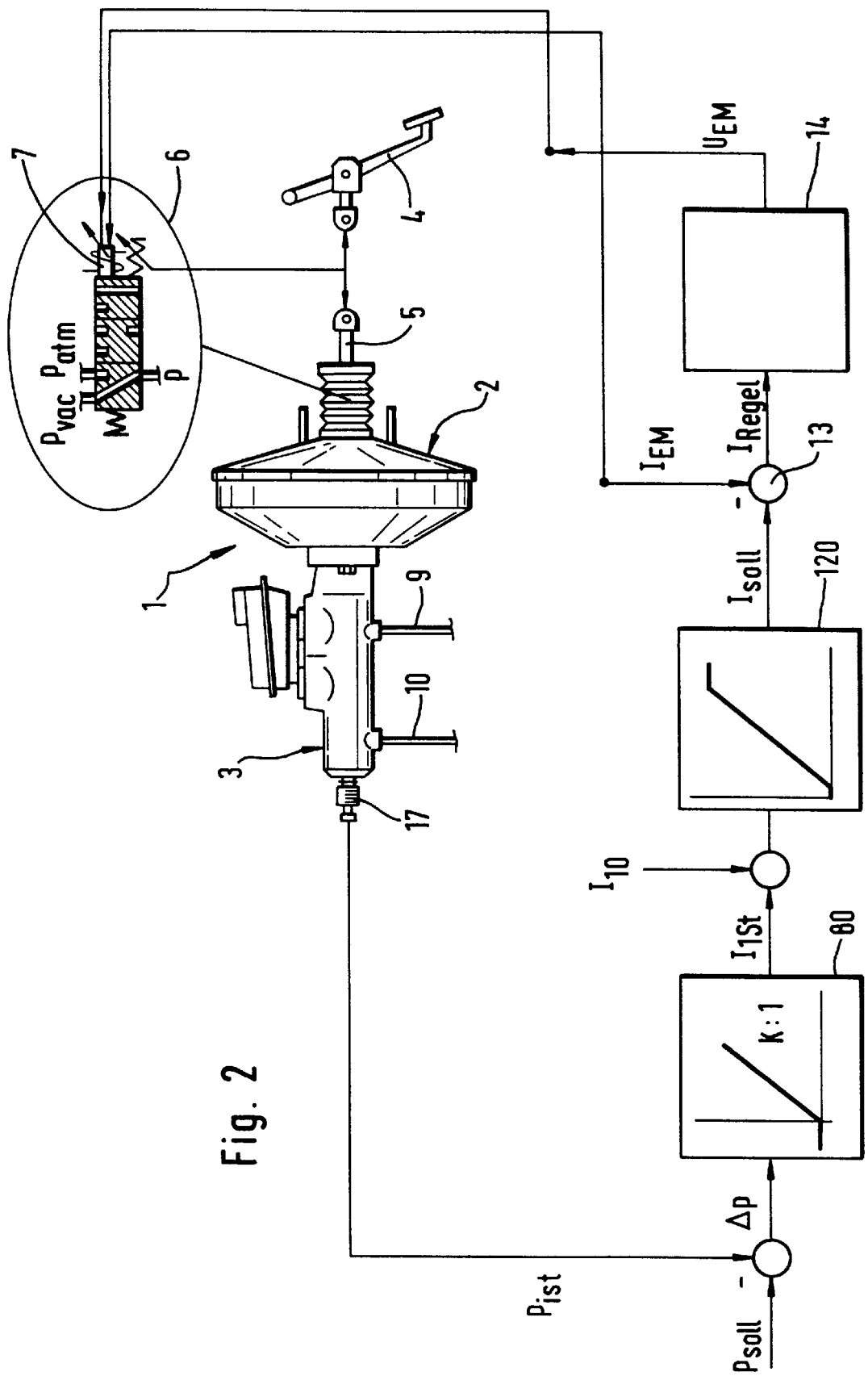
FIG. 2 is a view, corresponding to FIG. 1, of a second design of a brake system for implementing the method of the present invention.

The pressure controller mentioned with respect to FIG. 1 is configured as a non-linearly acting transmission member 80 with a downward limitation in the system shown in FIG. 2. The pre-control value $I_{10}$ to be added to the output quantity $I^{1St}$ of the pressure controller 82 represents the bottom limit value of the control range (by shifting the value $I_{1St}$=O on the vertical axis of coordinates upwardly). The top limit value of the control range is furnished by the limiter 120 exactly as in the embodiment shown in FIG. 1.

Figure 3:
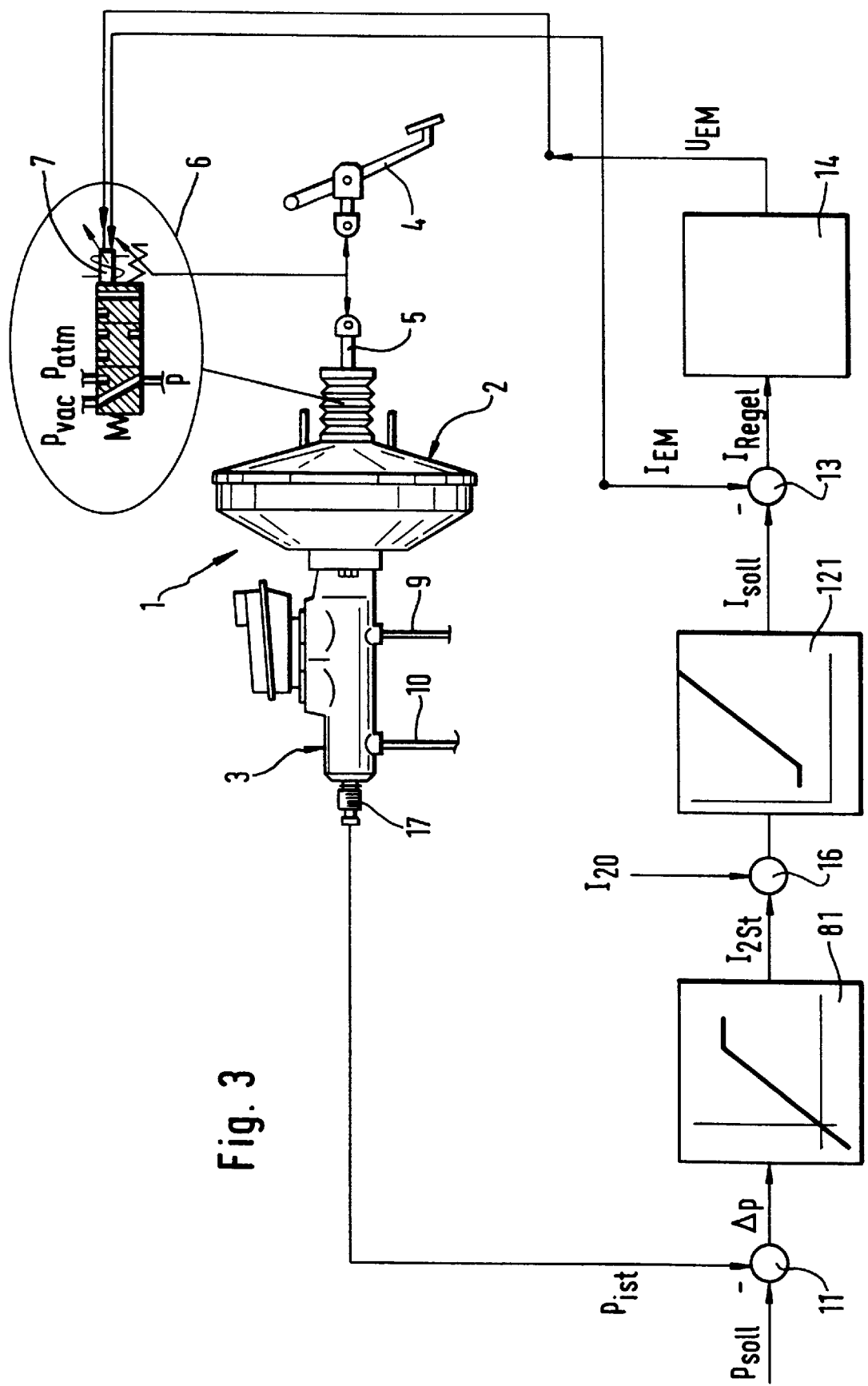
FIG. 3 is a view, corresponding to FIG. 1, of a third design of a brake system for implementing the method of the present invention.

The pressure controller mentioned with respect to FIG. 1 is configured as a non-linearly acting transmission member 81 with an upward limitation in the system shown in FIG. 3. The pre-control value $I_{20}$ to be added to the output quantity $I_{2St}$ of the pressure controller 81 represents the top limit value of the control range (by shifting the characteristic curve of the pressure controller 81 on the vertical axis of coordinates upwardly). The bottom limit value of the control range is furnished by the limiter 121 exactly as in the embodiment shown in FIG. 1.

Figure 4:
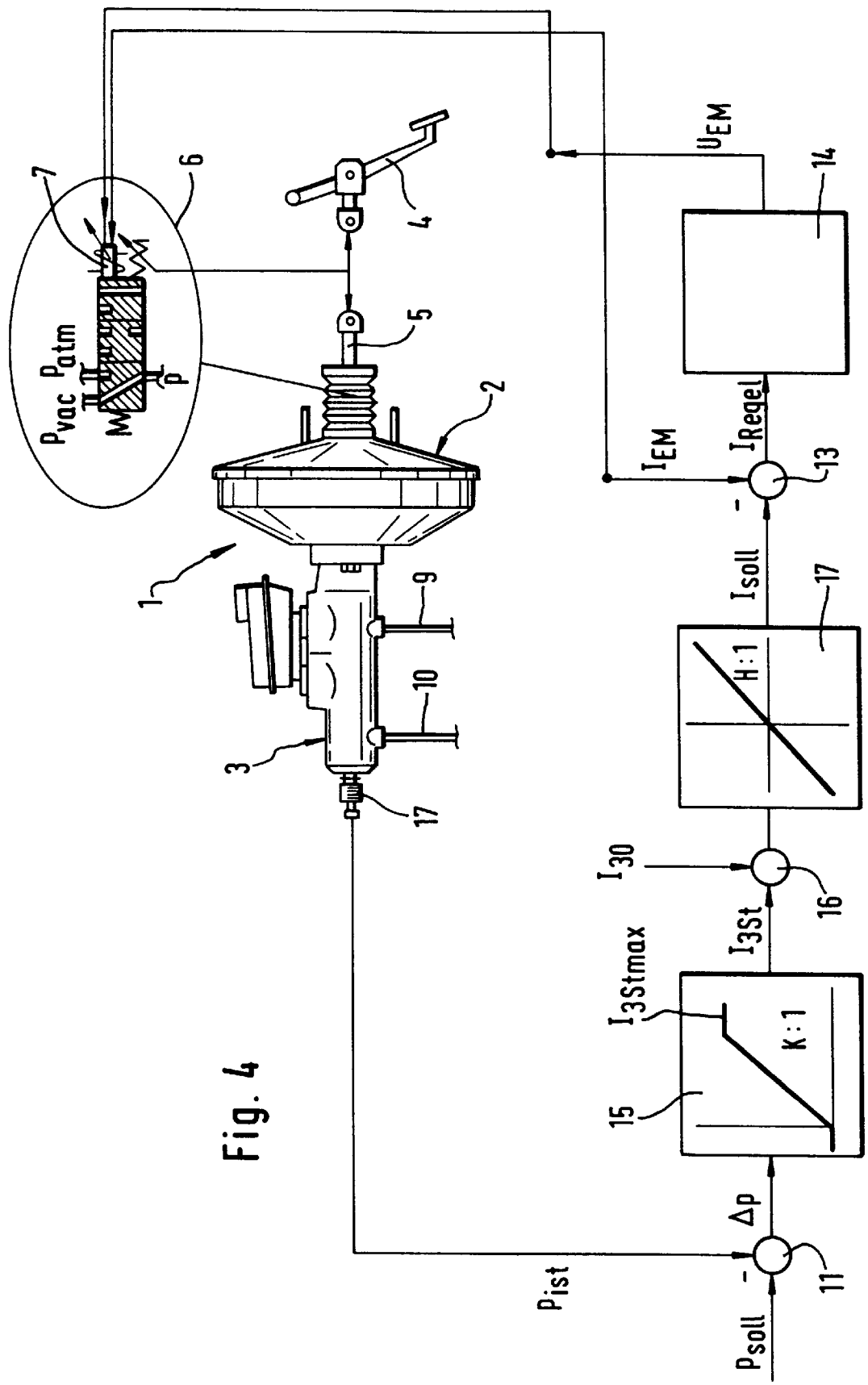
FIG. 4 is a view, corresponding to FIG. 1, of a different design of a brake system for implementing the method of the present invention of claim 6.

Finally, in the system shown in FIG. 4 the control difference δp is sent to a non-linear transmission member 15 with an upward and downward limitation of the output quantity. Connected downstream of the transmission member 15 in terms of effect is a linear booster 17 with a boosting factor H. A pre-control value $I_{30}$ is added to the output value $I_{3St}$ Of the pressure controller 15. The pre-control value $I_{30}$ is determined by solution of the following equations:

$I_{30}*H$=bottom limit value of the control range $(I_{3Stmax}+I_{30})*H$=top limit value of the control range, and $I_{3Stmax}$ represents the top limitation of the non-linear pressure controller 82.

I claim:

1. Method of operating a pneumatic brake power booster for automotive vehicles, said pneumatic brake booster of the type having a movable wall and a control valve controlling a pneumatic pressure differential which acts upon the movable wall, the control valve having at least two sealing seats and an elastic valve member which interacts with the sealing seats, wherein said booster is operable by both the driver by way of an actuating rod and, by a solenoid which is in a force-transmitting connection with one of the sealing seats wherein said solenoid can be supplied with a current, wherein a master brake cylinder is connected to the brake power booster and is connected to wheel brakes associated with individual vehicle wheels, comprising the steps of:

A) measuring the hydraulic pressure within the master brake cylinder and converting said measured pressure into a signal, B) comparing said measured pressure signal with a preset pressure value signal and producing therefrom a control difference signal, C) sending said control difference signal to a pressure controller having a first output quantity which corresponds to a control for the solenoid, D) supplying said first output quantity to a limiter which generates a second output quantity defining limit values of a current signal spanning the desired control range, E) comparing the second output quantity with the value of the current signal supplied to the solenoid, and F) sending the comparison result to a current controller which generates a voltage to be applied to the solenoid.

2. Method as claimed in claim 1, wherein the pressure controller is configured as a proportionally acting controller.

3. Method as claimed in claim 1, including adding a pre-control value to the output quantity of the pressure controller in order to reduce the boosting of the controller.

4. Method as claimed in claim 3, including configuring the pressure controller as a non-linear transmission member, wherein the pre-control value ensures the bottom limit value of the control range, and the top limit value thereof is furnished by the limiter.

5. Method as claimed in claim 3, including configuring the pressure controller as a non-linear transmission member, wherein the pre-control value ensures a top limit value of the control range, and a bottom limit value thereof is furnished by the limiter.

6. Method of operating a pneumatic brake power booster of the type including a movable wall and a control valve controlling a pneumatic pressure differential which acts upon the movable wall, the control valve having at least two sealing seats and an elastic valve member whish interacts with the sealing seats, and being operable by both a driver by way of an actuating rod and, by a solenoid which is in a force-transmitting connection with one of the sealing seats and can be supplied with a current, wherein a master brake cylinder is connected downstream of the brake power booster and is connected to wheel brakes associated with individual vehicle wheels, comprising the steps of:

measuring a hydraulic pressure introduced into the master brake cylinder and converting said measured pressure into a signal, comparing said pressure signal with a preset pressure value signal, sending said pressure signal to a non-linear transmission member generating an output quantity and having an upward and downward limitation, connected downstream of which transmission member is a booster having an output quantity, comparing said output quantity of said booster with a current valve supplied to the solenoid, sending the result of said comparison to a current controller which generates a voltage that is to be applied to the solenoid.

7. Method as claimed in claim 6, further including adding a pre-control value to the output quantity of the non-linear transmission member.

* * * * *

UNITED STATES PATENT AND TRADEMARK OFFICE
CERTIFICATE OF CORRECTION

PATENT NO. : 6,006,648
DATED : 12/28/99
INVENTOR(S) : Eckert, Alfred

It is certified that error appears in the above-identified patent and that said Letters Patent is hereby corrected as shown below:

In column 4, in claim 6, on line 39, please change "whish" to --which--.

Signed and Sealed this

Twenty-seventh Day of March, 2001

Attest:

NICHOLAS P. GODICI

Attesting Officer

Acting Director of the United States Patent and Trademark Office